*INVENTOR.*
WILLIAM A. ROBINSON
BY Douglas J. Johnson 3,559,046
EQUIVALENT COIL METHOD FOR SIMULTANE-
OUSLY MEASURING ELECTROMAGNETIC AND
MAGNETIC TIME TRANSIENT FIELDS
William A. Robinson, Don Mills, Ontario, Canada,
assignor to McPhar Geophysics Limited
Filed Dec. 9, 1968, Ser. No. 782,261
Int. Cl. G01v 3/08
U.S. Cl. 324—8                                    10 Claims

ABSTRACT OF THE DISCLOSURE

A method and apparatus for geophysical surveying utilizing the naturally occurring audio frequency transient magnetic fields and a locally generated electromagnetic field comprising utilizing mutually orthogonal receiver coils and combining voltages generated in the coils by the electromagnetic field and the transient magnetic fields in a proportion determined by their physical orientation and their pick up factors to provide process voltages for detection processing corresponding to those which would be obtained from an equivalent coil system embodying at least one pair of coils having their axes inclined at 45° to the horizontal and in 90° relation to each other to provide a measurement of any audio frequency transient magnetic field deviations created by an influencing geophysical body and a third coil having its axis at a selected selected angle $\theta$ to the horizontal, $\theta = 0°$ to 90°, to measure variations in the electromagnetic field created by such influencing geophysical body.

FIELD OF INVENTION

This invention relates to geophysical prospecting and more particularly to a method and means of simultaneously carrying out AFMAG measurements (measurements of the audio frequency magnetic components of the naturally occurring normally random electromagnetic fields) and EM measurements (measurements of a local artifically created electromagnetic field having a frequency also substantially in the audio frequency range).

RELATED INVENTION

Related inventions are disclosed in my application Ser. No. 782,272 entitled "Method and Means for Airborne Electromagnetic Exploration" and in my application Ser. No. 782,262 entitled "Method and Means of Geophysical Prospecting Utilizing Magnetic Time Transients."

BACKGROUND OF THE INVENTION

It is known as discussed in U.S. Pat. 3,149,278 that naturally occurring electromagnetic fields exist having electric and magnetic fields components in the audio frequency range. It is also known that in the absence of local conductors the naturally occurring magnetic field components have a random direction but lie in a horizontal plane. The presence of a local conductor or a local magnetic body however changes the magnitude and direction of these naturally occurring audio frequency magnetic fields components (the AFMAG fields) so that they are no longer random in direction nor are they completely horizontal.

The present airborne AFMAG system usually detects the presence of conductive anomalies by measuring the deviation from horizontal of the natural magnetic field vectors. The detection system which is used consists of two coils towed in a "bird" some 200 to 500 feet behind an aircraft, the two coils being mounted perpendicular to one another and at 45° to the horizontal.

When the field vector in space is horizontal the voltages induced in the two coils are equal and their ratio is unity regardless of amplitude variations of the field vector.

If the field vector in inclined above or below the horizontal the voltage induced in one of the coils is greater than that induced in the other of the coils. The ratio of the two coil voltages is determined by the angle of tilt but is again independent of the amplitude of the field vector.

Such a system has the ability to measure in the plane of the coils, any time independent AFMAG anomalies field polarization, that is deviation from the normal horizontal polarization and to identify the angle as being above or below the horizontal, and to make the measurement independent of changes in the amplitude of the field vector.

The reason that two mutually perpendicular coils are used is to ensure that their mutual coupling is a minimum so that voltages induced in one coil are not transferred to the other coil by mutual coupling as otherwise the measured ratio of the induced voltages would be different than the true value. Also great care is taken to ensure that the two mutually perpendicular coils are isolated as much as possible from any conducting material which would cause a change in the mutual coupling between the two coils giving rise to false signals from the coils.

As disclosed in my co-pending application Ser. No. 782,272 in carrying out airborne EM measurements it is desirable to orient the receiver coil, which again is towed some 300 to 500 feet behind the aircraft, so that is it positioned for maximum direct pick up from transmitter coil or coils mounted in the aircraft. The axis of the transmitter coil is normally horizontal and the receiver coil is therefore mounted in the bird with its axis vertical.

It will be understood that it would be highly desirable to carry out simultaneously both EM and AFMAG measurements but it will be appreciated that the introduction of a third coil having its axis vertical in association with a pair of coils having their axis at 45° to the horizontal would introduce a mutual coupling factor between all of the coils which would render their output voltages meaningless. On the other hand, if one of the pair of coils used for the AFMAG measurements was used for the EM receiver coil, to eliminate the need for three coils, its 45° orientation is normally not an appropriate receiver coil angle for EM measurements and such a coil angle would make it difficult to isolate out meaningful measurements from the signals or voltages generated in such receiver coil by the primary electromagnetic field transmitted from the aircraft, the secondary electromagnetic field also radiating from the aircraft as a result of the conductive of components parts of the aircraft, any secondary fields generated by the primary field linking with a conductor anomaly, and the naturally occurring transient magnetic fields all of which will have components in the audio frequency range which is the range of particular interest. It will be understood that in flight it is impossible to maintain the transmitter coil in the aircraft and the receiver coil in the towed bird in precisely the same relative orientation and to minimize this effect it is usually desirable to have the EM receiver at maximum coupling with the transmitter coil so that relative changes in orientation will create minimum variations in primary field pick up of the receiver coil. Thus, as explained, it is normally convenient to maintain the axis of the receiver coil vertical.

At present because of the above limitations it has not been possible with a simple coil system to reliably measure both the EM and AFMAG field simultaneously.

SUMMARY OF THE INVENTION

It is therefore the object of this invention to enable simultaneous EM and AFMAG measurements to be carried out with a high degree of reliability without the EM and AFMAG measurements interfering one with the other.

It is another important object to enable such measurements to be carried out with an extremely simple coil system.

Still another important object is to enable EM measurements to be carried out while simultaneously carrying out AFMAG measurements in more than one plane without the EM and AFMAG measurements interfering one with the other.

Still a further important object is to enable EM measurements to be carried out in any direction in space while simultaneously carrying out AFMAG measurements in one or more planes without the EM and AFMAG measurements interfering one with the other.

Again it is an object to enable EM and AFMAG measurements to be carried out simultaneously without the one interfering with the other while varying the direction or plane of the measurements according to any desired pattern.

These and other objects will become apparent from the following detailed description taken in conjunction with the accompanying drawings.

DETAILED DESCRIPTION

Figure 5:
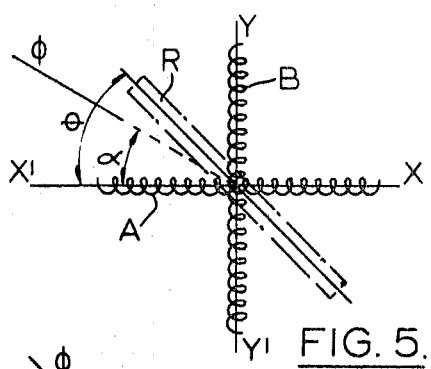
FIG. 5 is a diagrammatic view illustrating an equivalent single coil which, located at an angle $\theta$ to the X–X$^1$ axis, $\theta$ equal to 45° can give the same response to an electromagnetic field component $\phi$ at an angle $\alpha$ to the X–X$^1$ axis as two coils having their axis located on the X–X$^1$ and Y–Y$^1$ axis respectively where $\theta$ is 45°.

In order to fully understand the invention reference is made to the following analysis of the effect of an electromagnetic field component constituted by the magnetic field component $\phi$ in the X–Y plane at an angle $\alpha$ to X–X$^1$ axis on two coils A and B located respectively with their axis on the X–X$^1$ and the Y–Y$^1$ axis as illustrated in FIG. 5.

The voltage induced in the coil A on the X–X$^1$ axis by the field component $\phi$ will be $V_x$ volts and the voltage induced in the coil B in the Y–Y$^1$ axis by the field component $\phi$ will be $V_y$ volts.

It is known that $$e = N \frac{d\phi}{dt} \times 10^{-8} = NA \frac{dB}{dt} \times 10^{-8}$$

where $e$ = voltage induced in a coil of N turns
$\phi$ = magnetic field strength in Maxwells
$B$ = magnetic flux density in gauss
$A$ = area of coil in sq. cms.

For a sine wave magnetic field where $$B = B_{max} \cos wt$$

therefore $$e = NA\, B_{max} \times 10^{-8} \sin wt$$
$$= K \sin wt$$
$$K = B_{max} \times 10^{-8} NA$$

therefore $$V_x = K_x \sin wt \cos \alpha$$

and $$V_y = K_y \sin wt \sin \alpha$$

Assume that there was also present a coil R located at an angle $\theta$ to the X–X$^1$ axis. This coil would have a voltage $V_r$ induced therein by the field $\phi$. Thus this voltage $$V_r = K_r \sin wt \cos (\theta - \alpha)$$

For the coil R to be the single equivalent of the coils A and B it is necessary that $$V_r = V_x + V_y$$

or $$K_r \sin wt \cos (\theta - \alpha) = K_x \sin wt \cos \alpha + K_y \sin wt \sin \alpha$$

therefore $$K_r \cos (\theta - \alpha) = K_x \cos \alpha + K_y \sin \alpha$$

or $$K_r (\cos \theta \cos \alpha + \sin \theta \sin \alpha) = K_x \cos \alpha + K_y \sin \alpha$$

If $K_r$ is made $= \sqrt{K_x^2 + K_y^2}$ and $\theta = \tan^{-1} \dfrac{K_y}{K_x}$ the above equation is satisfied:

Left side $= \sqrt{K_x^2 + K_y^2}\, \dfrac{K_x}{\sqrt{K_x^2+K_y^2}} \cos \alpha + \dfrac{K_y}{\sqrt{K_x^2+K_y^2}} \sin \alpha$ that is $= K_x \cos \alpha + K_y \sin \alpha$ which is the right side.

PARTICULAR CASE

Suppose $K_x = K_y$ that is, the pick up factors of the coils A and B are identical therefore $$K_r = \sqrt{K_x^2 + K_x^2} = \sqrt{2} K_x$$

and $$\theta = \tan^{-1} 1 = 45°$$

This is the case of two identical pick up coils A and B at 90° to each other being replaced by a single coil R. The replacement coil R will be located at 45° to each of them and its pick up factor K will be made equal to $\sqrt{2}$ times that of either of the two coils. Conversely the output of a single coil R can be obtained by two coils A' and B at 90° to each other and both at 45° to the single coil if their outputs are added and if their pick up factors are if their outputs are added and if their pick up factors are made equal to $$\frac{1}{\sqrt{2}}$$

times that of the single coil.

Figure 6:
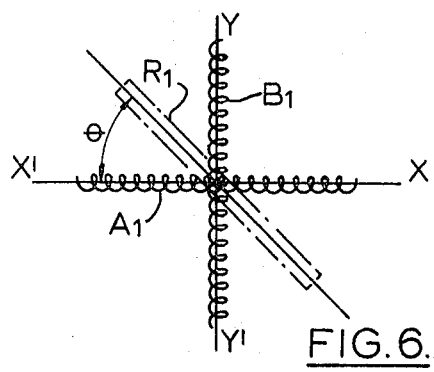
FIG. 6 is a view similar to FIG. 5 but where $\theta$ is any selected angle.
Figure 7:
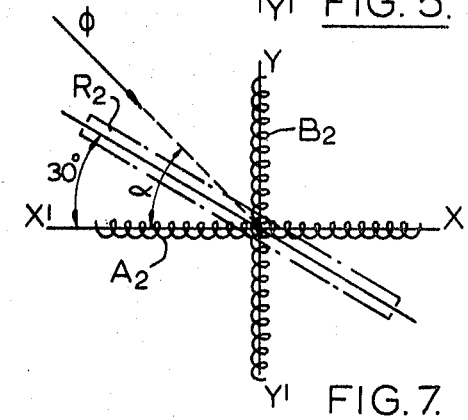
FIG. 7 is a view similar to FIG. 6 but where $\theta$ is 30°.

Suppose two right angle coils $A_1$ and $B_1$ are available and any desired pick up factors $K_x$ and $K_y$ can be chosen for these two coils. It is desired to choose such pick up factors that when the outputs of the coils are added, the result will be that which would be obtained from a single coil $R_1$ at a desired angle $\theta$ to the $X^1X$ coil axis as illustrated in FIG. 6. It is also required to know what the pick up factor $K_r$ of the single coil will be.

$$\text{Since } \theta = \tan^{-1} \frac{K_y}{K_x}$$

with $\theta$ given, the ratio of $K_y/K_x$ can be determined.

$$\text{but } K_r = \sqrt{K_x^2 + K_y^2} = K_x\sqrt{1 + \left(\frac{K_y}{K_x}\right)^2}$$

Since the ratio of $K_y/K_x$ is known, any value of $K_r$ can be obtained by choosing the value of $K_x$ according to the above equation.

EXAMPLE

It is required to obtain the output of a single coil $R_2$ whose axis is located at 30° to the horizontal, having a pick up factor of $K_r$ equal to 1.0 by using two coils $A_2$ and $B_2$ at right angles to each other, one being vertical and the other being horizontal. The values of the pick up factors of the two coils $A_2$ and $B_2$ can be determined as follows:

$$\frac{K_y}{K_x} = \tan 30° = \frac{1}{\sqrt{3}} = .578$$

$$K_r = K_x\sqrt{1 + \left(\frac{K_y}{K_x}\right)^2} = K_x\sqrt{1 + .334} = 1.155 K_x$$

if $K_r$ is to be $=1$ therefore $K_y = \frac{1}{1.155} = .866$ and $K_y = .500$ Consider a field $\phi$ at an angle $\alpha$ to the $X-X^1$ coil axis.

The voltage induced in the $X-X^1$ coil $A_2 V_x = K_x \sin wt \cos \alpha = .866 \sin wt \cos \alpha$.

The voltage induced in the $Y-Y^1$ coil $B_2 V_y = K_y \sin wt \sin \alpha = .500 \sin wt \sin \alpha$.

The voltage induced in the coil $R_2 V_r = K_r \sin wt \cos (\alpha - 30°) = 1.0 \sin wt (\cos \alpha \cos 30° + \sin \alpha \sin 30°) = \sin wt (.866 \cos \alpha + .500 \sin \alpha) = V_x + V_y$ as required.

Figure 1:
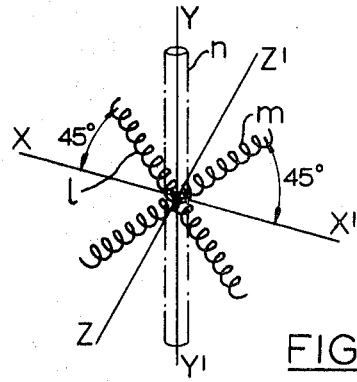
FIG. 1 is a diagrammatic view illustrating the equivalent EM detector coil on the Y–Y$^1$ axis which can in effect be created by combing the voltages of two coils in the X–Y plane at 45° to the X–X$^1$ axis to enable simultaneous EM measurements in the vertical plane and AFMAG measurements at 45° to the horizon.

Reference is now made to FIG. 1 which represents the application of the above principles in providing a simple two coil system for carrying out EM and AFMAG measurements. In the figure coil $l$ is a coil located in the XY plane having its axis located at 45° to the horizontal or X-X' axis. Coil $m$ is a coil in the same plane also having its axis located at an angle of 45° to the X—X axis. The two coils $l$ and $m$ are in 90° relationship one to the other. These coils are made to have the same pickup factors, i.e. the same NAe product where N=the number of turns and Ae=equivalent air core area. The coils $l$ and $m$, for example when towed at say a distance of 300 to 500 feet behind an aircraft in the attitude of FIG. 1 will enable any variations in the normally horizontally polarized transient magnetic fields to be detected. As explained in my co-pending application Ser. No. 782,262 the output of the two coils will be equal in a normal AFMAG field. The presence of an influencing geophysical body will alter the normally horizontally polarized AFMAG field and its presence is detected by the unbalance of the voltage generated in the coils $l$ and $m$. This unbalance is determined by processing the output voltages of the two coils to establish their ratios.

If a vertical coil in the X–Y plane such as coil $n$ were introduced into the system to make EM measurements it will be understood that such coil would introduce mutual coupling between all three coils and the outputs of all coils would be affected giving rise to voltages which would mask voltages produced by the respective naturally occurring AFMAG fields and EM fields created by the energizing of a transmitter coil located in the aircraft. The electrical effect of having such a third coil can be achieved simply by adding the output of the voltages of the two coils $l$ and $m$, that is $V_l + V_m$ to produce a voltage available for processing the EM measurements. As will be understood this processing particularly involves the detection of any quadrature or out of phase components which are out of phase with the artificially created primary field radiated from the aircraft. Such quadrature components are introduced by the presence of a local conductor body. As described in the arrangement of FIG. 1 only two physical coils are utilized. The output voltages $V_l$ and $V_m$ are used for the AFMAG measurements and the voltage $V_l + V_m$ is used for the EM mseasurements. Both AFMAG and EM measurements are normally carried out in the audio frequency range. However, the frequencies of interest for the AFMAG and EM measurements can be chosen sufficiently different that they can be readily isolated one from the other by filtering.

Figure 2:
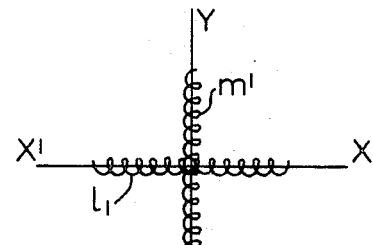
FIG. 2 is a diagram illustrating an alternative physical position of two coils in the X–Y plane whose axis lie on the X–X$^1$ and Y–Y$^1$ axis respectively for achieving the same measurements as those obtained with coils physically located as in FIG. 1.

Instead of placing two coils in the position of coils $l$ and $m$ in the 45° relationship to the X-X' axis the same results can be achieved by placing coils $l_1$ and $M_1$ on the X-X' and Y-Y' axis respectively as shown in FIG. 2. In this figure coil $m_1$ is in the correct position for carrying out EM measurements. For AFMAG measurements two equivalent coils in the XY plane at 90° to each other and at 45° to the horizontal are required. These two coils can be obtained from the sum and difference of the two voltages $V_{l_1}$ and $V_{m_1}$.

Figure 3:
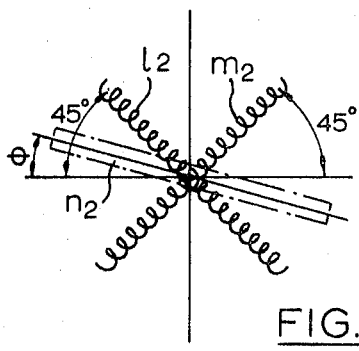
FIG. 3 is a diagrammatic view of an equivalent coil which can in effect be electrically created at an angle $\theta$ to the horizontal X–X$^1$ axis by coils physically located in the X–Y plane at 45° to the horizon.

Suppose a coil system is required for making the AFMAG measurement in the XY plane only, combined with an EM system that requires a single coil in the XY plane at some angle $\theta$ to the $X-X^1$ axis. This can be accomplished as follows with reference to FIG. 3. Here coils $l_2$ and $m_2$ each located in the XY plane and at 45° to the $Y-X^1$ axis have the same pick up factors as is required for the AFMAG measurement. As established above an equivalent coil $n_2$ can be obtained at any angle $\theta$ by satsifying the equation $$\theta = \tan^{-1} \frac{K_y}{K_x}$$

where $K_y/K_x$ is the ratio of the pick up factors of the coils $l_2$ and $m_2$.

But the pick up factors of coils $l_2$ and $n_2$ are equal. Therefore, to obtain the desired angle of the axis of coil $n_2$ it is necessary to add together part of the voltages from coils $l_2$ and $m_2$. The correct proportion is determined by the desired ratio $K_y/K_x$. Thus the equivalent of changing the pick factors can be effected by proportioning the actual voltage outputs of the coils.

Figure 4:
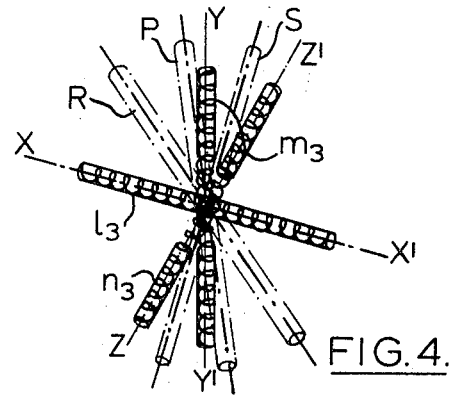
FIG. 4 is a diagrammatic view of 3 physical orthogonally oriented coils having their axis on the X–X$^1$, Y–Y$^1$ and Z–Z$^1$ axis respectively for carrying out simultaneously EM and AFMAG measurements in accordance with the invention.

Suppose a coil system is required to make AFMAG measurements in one or two planes combined with any number of EM coils in any angular position. This can be accomplished by the arrangement of coils $l_3$, $m_3$ and $n_3$ as illustrated in FIG. 4. Here three coils of equal pick up factors are located on the $X-X^1$, $Y-Y^1$ and $Z-Z^1$ axis respectively. It has been shown above that by combining the output voltage of any two of the coils $l_3$, $m_3$ and $n_3$ in the correct proportion an equivalent coil can be obtained at any desired angle with its axis in the plane of the two coils. Thus $V_{l_3}$ and $V_{m_3}$ can be combined to obtain an equivalent coil $R_4$ whose axis is in the XY plane at any angle $\theta$ to the $X-X^1$ axis.

Similarly $V_{m_3}$ and $V_{n_3}$ can be combined to obtain an equivalent coil S in the YZ plane at any angle $\theta_1$ to the Z-Z¹ axis. It would then be possible to combine the equivalent coil output voltages $V_R$ and $V_S$ to obtain a new equivalent coil P whose axis would be at any angle $\theta_3$ to the axis of coil R and lying in the plane of the axis of coils R and S. By this means an equivalent coil can be obtained whose axis is at any desired angle relative to the three reference axes X-X¹, Y-Y¹ and Z-Z¹ that is, at any angle in space. Any number of such equivalent coils can be obtained through the appropriate combinations of the three voltages $V_{l_3}$, $V_{m_3}$ and $V_{n_3}$. It is, of course, important that in the combining of the various voltages to produce the desired process voltages the circuitry involved should not change the pick up properties of the coils, to a degree that errors would result. This is easily achieved by the use of high input impedance circuits, such as field effect transistor follower circuits, to isolate the coils from succeeding circuitry.

It will be seen from the above that it is possible from three orthogonal coils to obtain any number of equivalent coils needed for AFMAG measurements in one or two planes as well as those needed for EM measurements at any angles in space. Measurements can be made at any number of frequencies (normally selected in the audio frequency range) within frequency limitations set by the electrical capabilities of the receiver coils. When EM and AFMAG measurements are made simultaneouly, the operating frequencies are chosen sufficiently for apart that interference of one with the other can be eliminated by filtering.

As previously shown, the output voltages from two orthogonal coils can be combined to produce an equivalent coil whose axis lines in the same plane as that of the two coils and makes any angle $\theta$ with a reference axis (which is also the same plane). The angle $\theta$ is determined by the proportion of the voltages from the two coils that is added together. This proportion could be controlled electronically and could be varied with time in any prescribed manner. Thus an equivalent coil would be obtained whose axis would lie in the plane of the receiving coil axes but making a variable angle with the reference axis. The angle of the axis could be varied with time in any prescribed manner. The principle could be applied to the three dimensional case to provide a coil whose axial position in space could be varied at will.

With the above illustrations it will be appreciated that the invention has a very wide application to the carrying out of simultaneous AFMAG and EM measurements and the above discussed specific examples are simply by way of illustration and not to be construed as limitations.

I claim:

1. A method of geophysical surveying utilizing the naturally occurring transient magnetic fields and a locally generated electromagnetic field comprising utilizing at least two receiver coils having predetermined pick up factors and fixed in relative relation so that their axes are mutually perpendicular, combining voltages generated in said coils by said fields in a proportion determined by the physical orientation of said coils and their pick up factors to provide process voltages for detection processing corresponding to those which would be obtained from an equivalent coil system comprising a first coil having its axis oriented at 45° to the horizontal, a second coil having its axis oriented at 90° to the first coil, and a third coil having its axis oriented at a selected angle $\theta$, $\theta$ equal 0° to 90°, to the horizontal, said process voltages obtained from said equivalent coil system being processed to measure the ratio of the voltages obtained from said first and second coils for determining deviations from the normal horizontal polarization of the naturally occurring transient magnetic fields as an indication of an influencing geophysical body, and processing the voltage obtained from said third coil to determine the presence of any out of phase components of the locally generated electromagnetic field as an indication of an influencing geophysical conductor body, 2. A process as claimed in claim 1 in which two mutually perpendicular coils having pick up factors $K_x$ and $K_y$ are utilized to provide on addition of their output voltages a process voltage corresponding to that obtainable from a coil having a pick up factor $K_r$ located with its axis at angle $\theta$ to the horizontal where $$\tan \theta = \frac{K_y}{K_x} \text{ and } K_r = \sqrt{K_x^2 + K_y^2}$$

3. A method as claimed in claim 1 in which two receiver coils of identical pick up factors are utilized and are physically located with their axes mutually perpendicular and at 45° to horizontal, and the direct output of said coils are processed to determine deviations in the normal horizontal polarization of the magnetic time transients, and the sum of the voltages from said two coils providing a voltage corresponding to a response from a vertical detector coil is processed to determine the presence of any out of phase components of the locally generated electromagnetic field.

4. A method as claimed in claim 1 in which two receiver coils of identical pick up factors are utilized and are physically located with axes mutually perpendicular, with the axis of one of the coils being horizontal and the axis of the other coil being vertical, and the output voltage of said coil with the axis vertical is processed to determine the presence of any out of phase components of said locally generated electromagnetic field and the sum and difference of voltages generated in said coils are processed to determine variations in the normal polarization of the transient magnetic fields.

5. A process as claimed in claim 1 in which three orthogonal coils are utilized.

6. A process as claimed in claim 5 in which said three orthogonal coils comprise a first coil having its axis horizontal, a second coil having its axis horizontal and perpendicular to the axis of the first coil, and a third coil having its axis vertical.

7. A method of geophysical surveying utilizing the naturally occurring transient magnetic fields and a locally generated electromagnetic field comprising utilizing three mutually orthogonal coils having predetermined pick up factors, combining voltages generated in a first and a second of said three coils by said fields in a proportion determined by the physical orientation in space of said first and second coils to provide a first set of process voltages for detection processing corresponding to those which would be obtained from a first equivalent coil system comprising a first pair of AFMAG measuring orthogonal coils oriented in a first plane comprised by the plane of said first and second coils and having their axis inclined at 45° to the horizontal and a first EM measuring coil oriented in the said first plane and at a selected angle $\theta$, $\theta$ equal 0° to 90° to the horizontal, combining voltages generated in said first and the third of said three orthogonal coils in a proportion determined by the physical orientation in space of said first and third coils to provide for detection processing a second set of process voltages corresponding to those which would be obtained from a second equivalent coil system comprising a second pair of AFMAG measuring orthogonal coils oriented in a second plane comprised by the plane of said first and third coils and orthogonal to said first plane and having their axis inclined at 45° to the horizontal, and a second EM measuring coil oriented in said second plane and at an angle $\theta_1$, $\theta_1$ equal to 0° to 90° to the horizontal, and processing said process voltages to determine deviations in the transient magnetic fields from normal horizontal polarization indicating the presence of an influencing geophysical body and to determine the presence of out of phase components in said locally generated electromagnetic field indicating the presence of an influencing conductor body.

8. A method as claimed in claim 7 in which the outputs of said first and second EM measuring coils are combined to provide an equivalent third EM measuring coil lying in the plane of said first and second EM measuring coils.

9. A method as claimed in claim 7 in which the proportion of said combined voltages of said first and second coils and said first and third coils is varied with time.

10. A method as claimed in claim 7 in which said three orthogonal coils have identical pick up factors and the voltages of each of said first and second coils and said first and third coils are proportioned to give equivalent pick up factors of $K_x$, $K_y$ and $K_z$ for said first, second and third coils respectively where $$\theta = \tan^{-1} \frac{K_y}{K_x} \text{ and } \theta_1 = \tan^{-1} \frac{K_z}{K_x}$$

References Cited

UNITED STATES PATENTS

| | | | |
|---|---|---|---|
| 2,694,793 | 11/1954 | Martin | 324—8X |
| 3,149,278 | 9/1964 | Cartier et al. | 324—8X |
| 3,389,331 | 6/1968 | Vexler | 324—8 |

GERARD R. STRECKER, Primary Examiner